March 23, 1965     E. S. DAYHOFF     3,175,165

LIGHT CONTROLLED VARIABLE FREQUENCY PULSE GENERATOR

Filed June 29, 1962

CAPACITOR VOLTAGE

COLLECTOR VOLTAGE

INVENTOR.
EDWARD S. DAYHOFF
BY *OE Hodges*
                   ATTY.
*P. R. Harder* AGENT.

United States Patent Office 3,175,165
Patented Mar. 23, 1965

3,175,165
LIGHT CONTROLLED VARIABLE FREQUENCY
PULSE GENERATOR
Edward S. Dayhoff, 1618 Tilton Drive, Silver Spring, Md.
Filed June 29, 1962, Ser. No. 207,165
1 Claim. (Cl. 331—66)
(Granted under Title 35, U.S. Code (1952), sec. 266)

The invention described herein may be manufactured and used by or for the Government of the United States of America for governmental purposes without the payment of any royalties thereon or therefor.

This invention relates generally to a telemetering signal generator and more particularly to a telemetering signal generator for converting the direct current signal output of a sensing element which varies in response to a condition into a repetitive pulse signal, the pulse repetition rate of which is a function of the sensing element current.

In the past, it has been the general practice in the field of telemetering signal generators to employ an amplifier between the sensing element and a blocking oscillator or other variable frequency device to amplify the direct current output of the sensing element to a magnitude sufficient to control the frequency of the variable frequency device. Although such devices have generally served their purpose, they have not proved entirely satisfactory under all conditions of service for the reasons that the use of an amplifier between the sensing element and the oscillating device requires extra space, contributes extra weight, utilizes power, and, due to the added number of parts and connections, reduces the overall reliability of the system.

The general purpose of this invention is to provide a telemetering signal generator which embraces all the characteristic advantages of similarly employed devices of the prior art but possesses none of the aforedescribed disadvantages.

To attain this, the present invention contemplates a unique coupling arrangement between the sensing element and a blocking oscillator which does not require the aforementioned amplifier yet provides a large change in output frequency of the oscillator for small changes in the sensing element output current thereby providing an overall effect of amplifying the changes of the sensing element current yet maintaining a response time of approximately one cycle. To accomplish this result the amplifier between the sensing element and the blocking oscillator is replaced by a light sensitive resistor or photocell of the solid state type utilized in the blocking oscillator circuit as the frequency determining resistor and an incandescent lamp which is connected across the output of the sensing element and located in close proximity to the light sensitive resistor.

If necessary, the light sensitive resistor or photocell and the incandescent lamp may be inclosed within a suitable housing which excludes external light from impinging upon the resistor or cell but which permits light emitted from the lamp to fall directly upon the sensing element. When the brightness of the lamp varies due to changes in the direct current output from the sensing element, the resistance of the light sensing element varies therewith and the repetition frequency of the blocking oscillator will likewise vary accordingly, the output of the oscillator being utilized in turn to control, modulate or otherwise be transmitted by any sort of signaling device. The light output of the lamp varies rapidly with small changes in current therethrough and, since the resistance of a light sensitive resistor or photocell also varies rapidly with small changes in the illumination impinging thereon, the overall system provided by the invention is highly sensitive, a small change in the sensing element current causing a large change in the frequency output of the oscillator thereby affecting an overall amplification of the changes of the sensing element current. Further, the response time of the lamp and of the light sensitive element is sufficient to provide an overall response time of the system of less than one cycle. Since the oscillator draws essentially no power between pulses, the present invention by eliminating the necessity of an amplifier provides a unit having a low power consumption and further provides an isolation of the input circuit which increases the versatility of the device and reduces the design changes necessary to accommodate different types of sensing elements.

The general object of the present invention is, therefore, to provide a telemetering signal generator for converting a direct current signal output of a sensing element to a repetitive pulse signal, the repetition rate of which is a function of the sensing element current without the necessity of utilizing an electronic amplifier.

Another object of the invention is to provide a telemetering signal generator for converting the direct current output of a sensing element into a repetitive pulse signal, the repetition rate of which is a function of the amplitude of the sensing element signal, the telemetering signal generator having a lower power consumption, a higher reliability, and being mechanically more rugged than the devices heretofore known.

A further object of the invention is the provision of a light sensitive resistor or photocell and a lamp as an amplifier and coupling device for influencing the repetition frequency of a blocking oscillator in accordance with the output signal of a sensing element.

Still another object is to provide an isolation circuit for a telemetering signal generator which allows greater versatility of a device and ready accommodation of the generator to different sensing elements.

Other objects and many of the attendant advantages of the invention will be more readily appreciated as the same becomes better understood by reference to the following detailed description when considered in connection with the accompanying drawing wherein.

Figure 1:
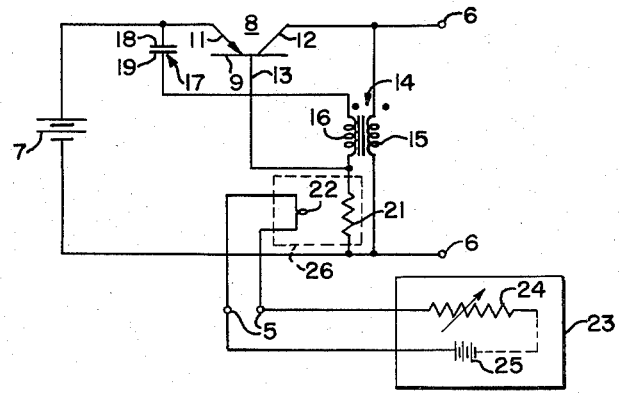
FIG. 1 is a schematic circuit diagram of a transistorized blocking oscillator circuit embodying the instant invention.

Referring now to the drawing and more particularly to the FIG. 1 thereof, there is illustrated a telemetering signal generator having a pair of input terminals 5, a pair of output terminals 6, a power source 7, and a switching device 8 connected in series between one side of the power source and one of the output terminals, the other output terminal being directly connected to the other side of power source 7. As illustrated, the switching device 8 may be a PNP type transistor having a body 9 and input or emitter electrode 11, an output or collector electrode 12 and a control or base electrode 13. It should be understood, of course, that a NPN type transistor may be utilized with the appropriate circuit changes. Transformer 14 has its primary winding 15 directly connected across the output terminals 6 while one side of secondary winding 16 is directly connected to the control electrode 13 of switching device 8 and its other end connected through capacitor 17 having plates 18 and 19 to the input electrode 11. Emitter 11, base 13 and secondary winding 16 provide an electrical series circuit forming a discharge path for capacitor 17 while the voltages developed across capacitor 17 and secondary winding 16 of transformer 14 provide the necessary bias voltages for the appropriate operation of transistor 8.

A variable impedance, such for example, as a light sensitive resistor or photocell 21 is connected between the junction of base 13 and secondary winding 16 and the negative terminal of source 7 and completes a charging circuit for capacitor 17 which comprises secondary winding 16, variable impedance 21 and the power source 7 connected in electrical series circuit across capacitor 17.

Adjacent the light sensitive impedance 21 is a light emitting device 22, such, for example, as an incandescent lamp, connected across input terminals 5 to which is connected a sensing device 23 which, for example, may be a Pirani gage which contains a filament 24, the resistance of which varies in response to variations in gas pressure surrounding the filament, and a direct current power source 25 connected in series therewith.

As is well known, as the gas pressure within which the filament of the Pirani gage is located varies, the resistance thereof also varies thereby increasing or decreasing the amplitude of the direct current supplied to the light emitting device 22. This change in current results in a change of the intensity of the light impinging upon the light-sensitive impedance 21 thereby varying its resistance. Changes in the resistance of impedance 21 varies the charge rate of capacitor 17, the voltage across which controls the initiation of the "ON" period of switching device 8 and, therefore, controls the repetition rate or the frequency of the output pulses appearing across output terminal 6.

If desirable, light sensitive impedance 21 and light emitting device 22 may be enclosed in a housing 26 to prevent externally emitted light from impinging on impedance 21.

Figure 2A:
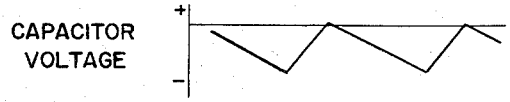
FIGS. 2a and 2b are graphs showing related voltage curves illustrating certain operating characteristics of the circuit of FIG. 1 in accordance with the invention.
Figure 2B:
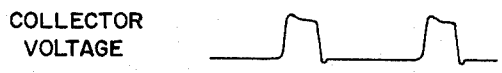

In operation, let it be assumed that transistor 8 is non-conducting and capacitor 17 is being charged by power source 7 through secondary winding 16 and variable impedance 21. FIG. 2a illustrates the voltage of plate 19 with respect to plate 18 of capacitor 17, plate 19 accumulating a negative charge with respect to plate 18. The voltage developed across capacitor 17 is applied across the emitter-base junction of transistor 8. As the voltage across capacitor 17 continues to increase, base 13 of transistor 8 is driven negative with respect to emitter 11 until emitter current begins to flow, releasing holes to the collector. The collector current causes the collector potential to rise thereby causing a current in primary winding 15 of transformer 14 wihch induces a voltage in the secondary winding 16 which tends to increase the bias potential between emitter 11 and base 13 of transistor 8 which further increases the emitter current. The regenerative transition from low emitter current to high emitter current may occur from a few hundredths of a microsecond to several microseconds, depending upon the characteristics of the transistor and the transformer producing a sharply rising leading edge of the collector voltage output pulse as illustrated in FIG. 2b.

During the output pulse, capacitor 17 is discharged through the emitter-base junction of transistor 8 and secondary winding 16, the voltage developed across winding 16 by the output pulse across terminals 6 and applied to primary winding 15 being in a direction to aid in the discharge of capacitor 17. The collector voltage pulse is terminated either by saturation occurring in transformer 14 or by saturation of transistor 8. In either event, the collapse of the magnetic field in transformer 14 induces a voltage in secondary winding 16 which tends to reverse bias transistor 8 thereby causing a sharp transition in the collector voltage at the trailing edge of the pulse. At the end of the output pulse, the voltage across capacitor 17 is not sufficient to cause emitter current to flow in transistor 8 and, depending upon the voltage developed across secondary winding 16 as the magnetic field collapses, plate 19 may even become positively charged with respect to plate 18. Capacitor 17 again starts to charge through secondary winding 16 and variable impedance 21 until emitter current again begins to flow in transistor 8 and the cycle is repeated.

So long as the resistance of impedance 21 remains constant, the time required to charge capacitor 17 to a sufficient magnitude to cause the flow of emitter current will be substantially constant and the repetition rate of the pulses appearing at the collector will likewise be constant. If, however, the resistance of filament 24 changes under the influence of the effecting medium, current supplied to lamp 22 will either increase or decrease thereby increasing or decreasing the resistance of impedance 21. If, for example, the resistance of impedance 21 is decreased under the influence of lamp 22, the capacitor 17 charges more rapidly and the leading edge of the next succeeding output pulse appearing at output terminals 6—6 occurs sooner in time. Since, however, the duration of the ON time of switching device 8 is not dependent upon the impedance of impedance 21 the output pulse duration remains constant and the capacitor is again discharged to the same degree. Thus, the repetition rate of the output voltage pulses is proportionally increased as the resistance of impedance 21 is decreased which itself is a function of the amplitude of the direct current supplied thereto by sensing device 23. Likewise, when the resistance of impedance device 21 is increased under the influence of lamp 22, the time required to charge capacitor 17 to the voltage necessary to initiate emitter current becomes greater and the repetition frequency of the output pulses is reduced.

Since, by appropriate selection of the light sensitive impedance 21 and of lamp 22, the resistance of impedance 21 may be made to vary inversely with the intensity of the illumination provided by lamp 22, and since the illumination of lamp 22 varies with the amplitude of direct current supplied by sensing device 23, the repetition rate or frequency of the pulses occurring at the output terminals 6—6 of the telemetering signal device is a function of the amplitude of the direct current supplied by sensing element 23.

It should be understood that other types of light sources other than the incandescent lamp may be utilized as the light responsive device 22, such, for example, as neon lamps or electroilluminescent plates. It is further apparent that the input signal to input terminals 5 need not be a direct current signal but may be an alternating current, the amplitude of which is varied in response to a sensed condition provided, however, that the frequency of the alternating current source is great enough to avoid any variation in the light emitted by the illuminating device 22 by virtue of the frequency of the input signal. Further, by appropriate selection of the light sensitive resistor or solid state photocell 21 and of the characteristics of a light emitting device 22 the optimum sensitivity of the device may be realized for differing types of sensing elements and different ranges of operation may be readily provided.

Obviously many modifications and variations of the present invention are possible in the light of the above teachings. It is therefore to be understood, that within the scope of the appended claim the invention may be practiced otherwise than as specifically described.

What is claimed as new and desired to be secured by Letters Patent of the United States is:

A blocking oscillator having a frequency varied in response to a control signal comprising a pair of input terminals, a pair of output terminals, a transistor having an input electrode, an output electrode, and a control electrode, a power source having a pair of terminals, one of the terminals of said power source being connected to the input electrode of said transistor; the other terminal of said power source being connected to one of said output terminals, and the output electrode of said transistor being connected to the other of said output terminals, a transformer having a primary winding and a secondary winding, said primary winding being connected across said output terminals,
a capacitor,
a light sensitive impedance device,
said capacitor, said secondary winding, and said impedance device being connected in electrical series circuit between the terminals of said power source so as to form a junction between said secondary windings and said impedance device, said electrical series circuit forming a charge path for said capacitor,
the control electrode of said transistor being connected to the junction of said secondary winding and said impedance device in such a manner that the input electrode and the control electrode of said transistor and said secondary winding form a discharge path for said capacitor,
a light source adjacent said light sensitive impedance device, said light source being connected across said input terminals in such a manner that when an input signal is applied thereto the impedance of said light sensitive impedance device is varied in response to the variation in intensity of said light source to control the frequency of said blocking oscillator.

References Cited by the Examiner
UNITED STATES PATENTS

| | | | |
|---|---|---|---|
| 1,886,813 | 11/32 | Hulburt et al. | 331—66 X |
| 2,273,537 | 2/42 | Rehder | 331—66 X |
| 2,904,755 | 9/59 | Foley | 331—112 |
| 2,988,709 | 6/61 | Janssen | 331—66 X |

ROY LAKE, *Primary Examiner.*

JOHN KOMINSKI, *Examiner.*